United States Patent [19]

Geiermann et al.

[11] Patent Number: 5,125,554
[45] Date of Patent: Jun. 30, 1992

[54] C-FRAME SHEET SPLICER

[75] Inventors: Thomas J. Geiermann, Bangor Township, Bay County; Kenneth A. Schmidt, Bay City, both of Mich.

[73] Assignee: Newcor, Inc., Troy, Mich.

[21] Appl. No.: 764,999

[22] Filed: Sep. 24, 1991

Related U.S. Application Data

[63] Continuation of Ser. No. 680,677, Apr. 3, 1991, abandoned.

[51] Int. Cl.⁵ .................. B23K 11/06; B23K 11/087
[52] U.S. Cl. .................................. 228/5.7; 228/32; 219/82
[58] Field of Search .......... 228/5.7, 32, 44.3, 49.4, 228/212, 265; 72/214, 237; 219/82, 102

[56] References Cited

U.S. PATENT DOCUMENTS

| | | |
|---|---|---|
| 3,225,999 | 12/1965 | Heller et al. |
| 3,270,180 | 8/1966 | Morley et al. |
| 3,307,764 | 3/1967 | Robinson ............... 219/82 |
| 3,403,833 | 10/1968 | Wheeler et al. ......... 228/5.7 |
| 3,511,961 | 5/1970 | Morley et al. |
| 3,618,844 | 11/1971 | Morley et al. ........... 228/5.7 |
| 3,909,578 | 9/1975 | Williams et al. ........ 219/82 |

FOREIGN PATENT DOCUMENTS

| | | |
|---|---|---|
| 829386 | 5/1981 | U.S.S.R. |
| 837695 | 6/1981 | U.S.S.R. |

*Primary Examiner*—Samuel M. Heinrich
*Attorney, Agent, or Firm*—Flynn, Thiel, Boutell & Tanis

[57] ABSTRACT

A pair of sheetlike members are supported on a pair of support tables disposed on opposite sides of a movable splicing mechanism. The pair of sheets are advanced inwardly from opposite directions into a splicing position wherein the adjacent edge portions of the sheets overlap, and are suitably secured by side clamp mechanisms. The movable splicing mechanism is then linearly moved along the overlapping edges, and opposed weld rolls rollingly and clampingly engage the overlapping edges therebetween to effect welding thereof. A pair of planishing rolls rollingly and compressingly engage the seam weld and follow along behind the weld rolls to effect flattening of the seam weld. After the splicing mechanism moves along the entire length of the overlapping edges to create a mash seam weld between, a gripper mounted on the mechanism engages opposite sides of the sheet, and the mechanism then returns to its original position and simultaneously discharges the spliced sheet forwardly of the apparatus. The planish and weld rolls are maintained in a separated condition during this return movement of the splicing mechanism.

27 Claims, 11 Drawing Sheets

C-FRAME SHEET SPLICER

This application is a continuation of U.S. Ser. No. 07/680.677, filed Apr. 3, 1991, now abandoned.

FIELD OF THE INVENTION

This invention relates to an apparatus for splicing together two metal sheets by means of a mash seam weld for creating a single larger metal sheet.

BACKGROUND OF THE INVENTION

In many manufacturing applications, thin platelike metal sheets are utilized for forming components, and the forming operation often results in leftover sheet metal pieces which are normally too small for further use and hence disposed of as waste. These waste sheet metal pieces, however, are themselves often times of significant size, and many manufacturers are desirous of being able to utilize this waste, although in most cases are unsuccessful in doing so.

In other situations the product being manufactured may require or desire use of dissimilar materials, such as having a coated or galvanized material in some regions, and a noncoated material in other regions. However, if the design requires that the critical regions be manufactured of one piece, then optimum performance, design or efficiency is generally sacrificed and the piece is formed from a piece of sheet metal having the highest requirements, such as forming the piece entirely of a plated or galvanized material, even though such plating or galvanizing is not required in its entirety.

Accordingly, it is an object of this invention to provide an apparatus which is able to improve upon the manufacturing disadvantages summarized above. More specifically, the present invention relates to an improved apparatus which can create a mash seam weld between two sheetlike pieces so as to create a larger single sheetlike piece having properties similar to a virgin or nonwelded piece. With this improvement, smaller pieces which are normally disposed of as waste can be mash seam welded (i.e. spliced) together so as to create larger useful sheetlike pieces which can hence be utilized for manufacturing purposes. Alternatively, smaller pieces of dissimilar properties, such as coated and noncoated sheetlike pieces, can be mash seam welded to create a single larger sheetlike piece which can be utilized to form a piece of manufacture having optimum properties, and at the same time permit efficient and cost effective use of materials. As a further alternative, two sheets of different thickness can be splined together by a mash seam weld.

In the apparatus of the present invention, a pair of sheetlike members are supported on a pair of support tables disposed on opposite sides of a movable splicing mechanism. The pair of sheets are advanced inwardly from opposite directions into a splicing position wherein the adjacent edge portions of the sheets overlap, and are suitably secured by side clamp mechanisms. The movable splicing mechanism is then linearly moved along the overlapping edges, and opposed weld rolls rollingly and clampingly engage the overlapping edges therebetween to effect welding thereof. A pair of planishing rolls rollingly and compressingly engage the seam weld and follow along behind the weld rolls to effect flattening of the seam weld, whereby the resulting seam weld hence has a thickness only slightly greater than the thickness of a single sheet. After the splicing mechanism moves along the entire length of the overlapping edges to create a mash seam weld between, a gripper mounted on the mechanism engages opposite sides of the sheet, and the mechanism then returns to its original position and simultaneously discharges the spliced sheet forwardly of the apparatus. The planish and weld rolls may be maintained in a separated condition during this return movement of the splicing mechanism.

Other objects and purposes of the apparatus according to the present invention, including the structural and functional features and advantages associated with this apparatus, will be apparent upon reading the following specification and inspecting the accompanying drawings.

Figure 13:
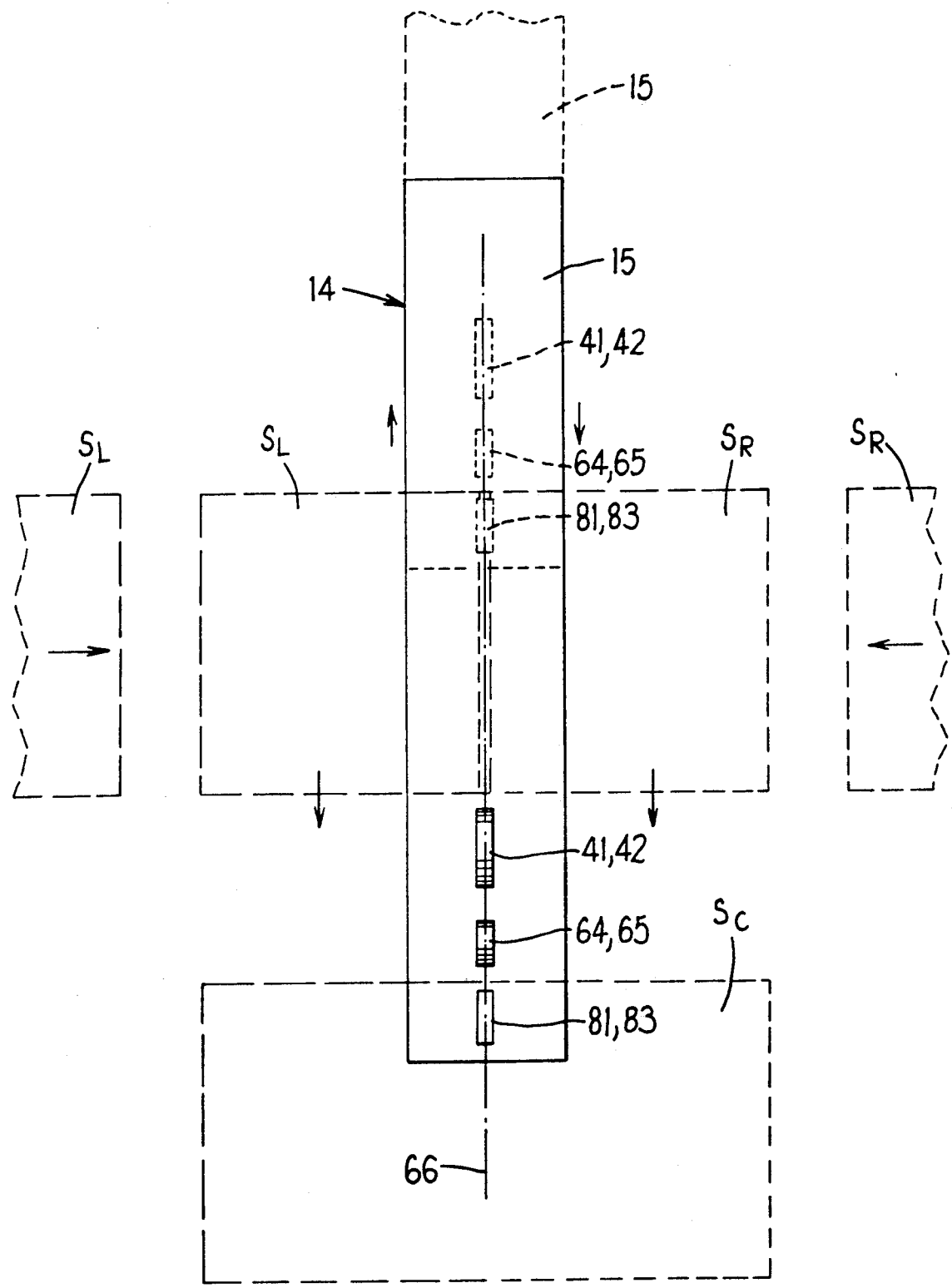
FIG. 13 is a diagrammatic plan view illustrating the movements of the sheets and the splicing mechanism.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will refer to movement in a direction toward the operator, which direction is downwardly in FIGS. 2 and 13. The words "inwardly" and "outwardly" will refer to directions toward and away from, respectively, the geometric center of the apparatus and designated subassemblies or components thereof. Said terminology will include the words specifically mentioned, derivatives thereof, and words of similar import.

DETAILED DESCRIPTION

Figure 1:
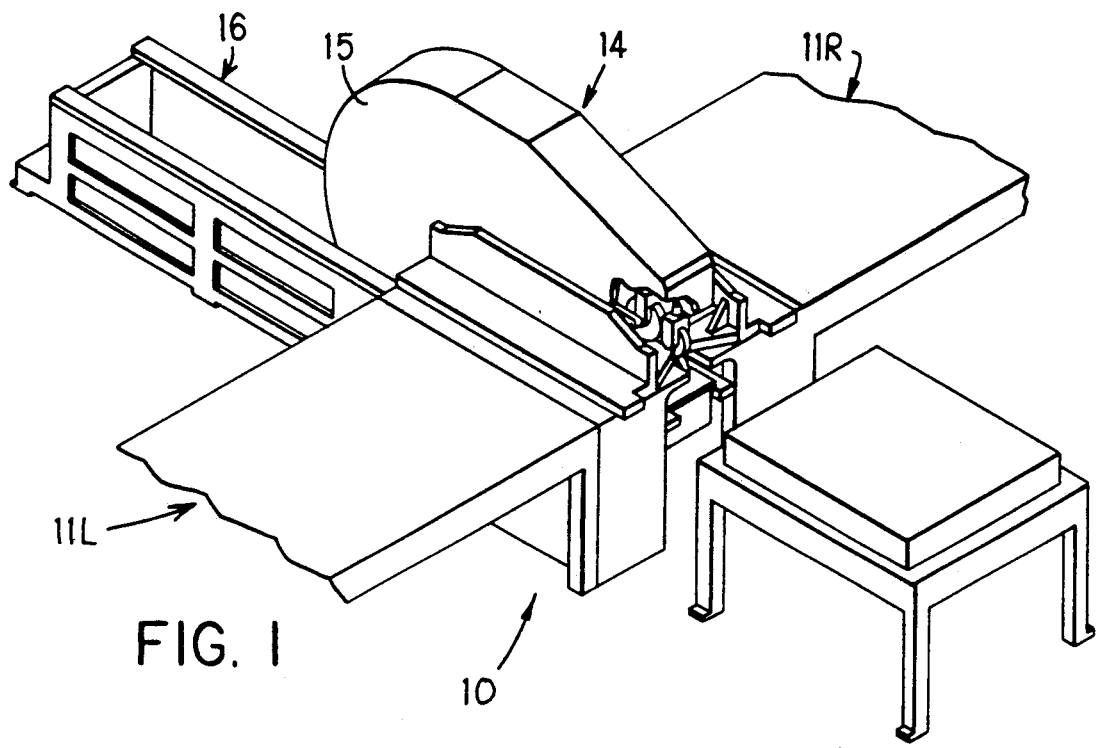
FIG. 1 is a fragmentary perspective view which diagrammatically depicts major subassemblies and components associated with the sheet splicing apparatus of the present invention.
Figure 2:
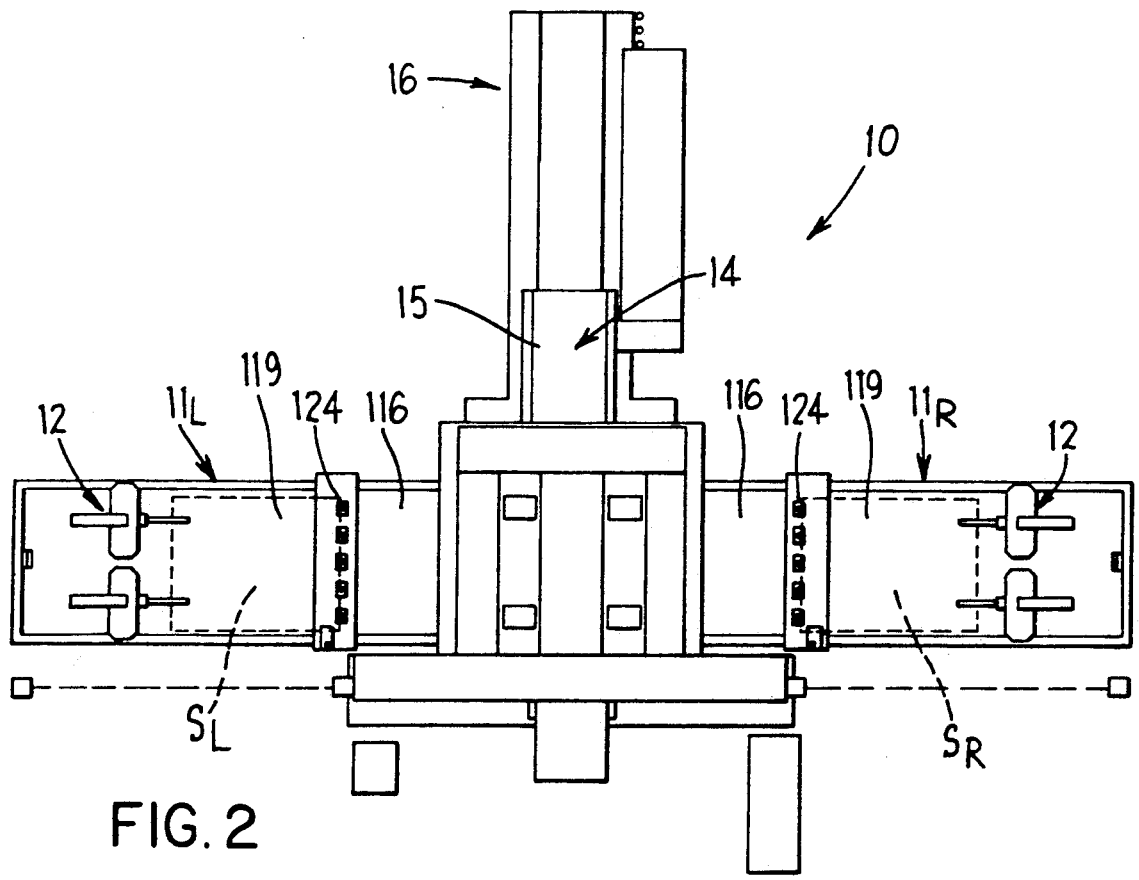
FIG. 2 is a top plan view of the sheet splicing apparatus.

Referring to FIGS. 1 and 2, there is diagrammatically illustrated a sheet splicer 10 according to the present invention. This sheet splicer 10 includes a pair of sheet supporting structures or tables 11R and 11L disposed on the right and left sides of the apparatus, which support tables are only diagrammatically illustrated in FIGS. 1 and 2. Each support table 11 has a sheet advancing mechanism 12 whereby right and left sheets, designated $S_R$ and $S_L$, can be moved inwardly toward one another to permit adjacent edges to be vertically overlapped, as described below.

The apparatus 10 also includes a sheet splicing mechanism 14 which cooperates with and creates a mash seam weld between the overlapping edges of the sheets. This movable splicing mechanism 14 includes a generally C-shaped support or carriage 15 supported for generally horizontal reciprocating movement on a generally rigid frame 16.

Figure 4:
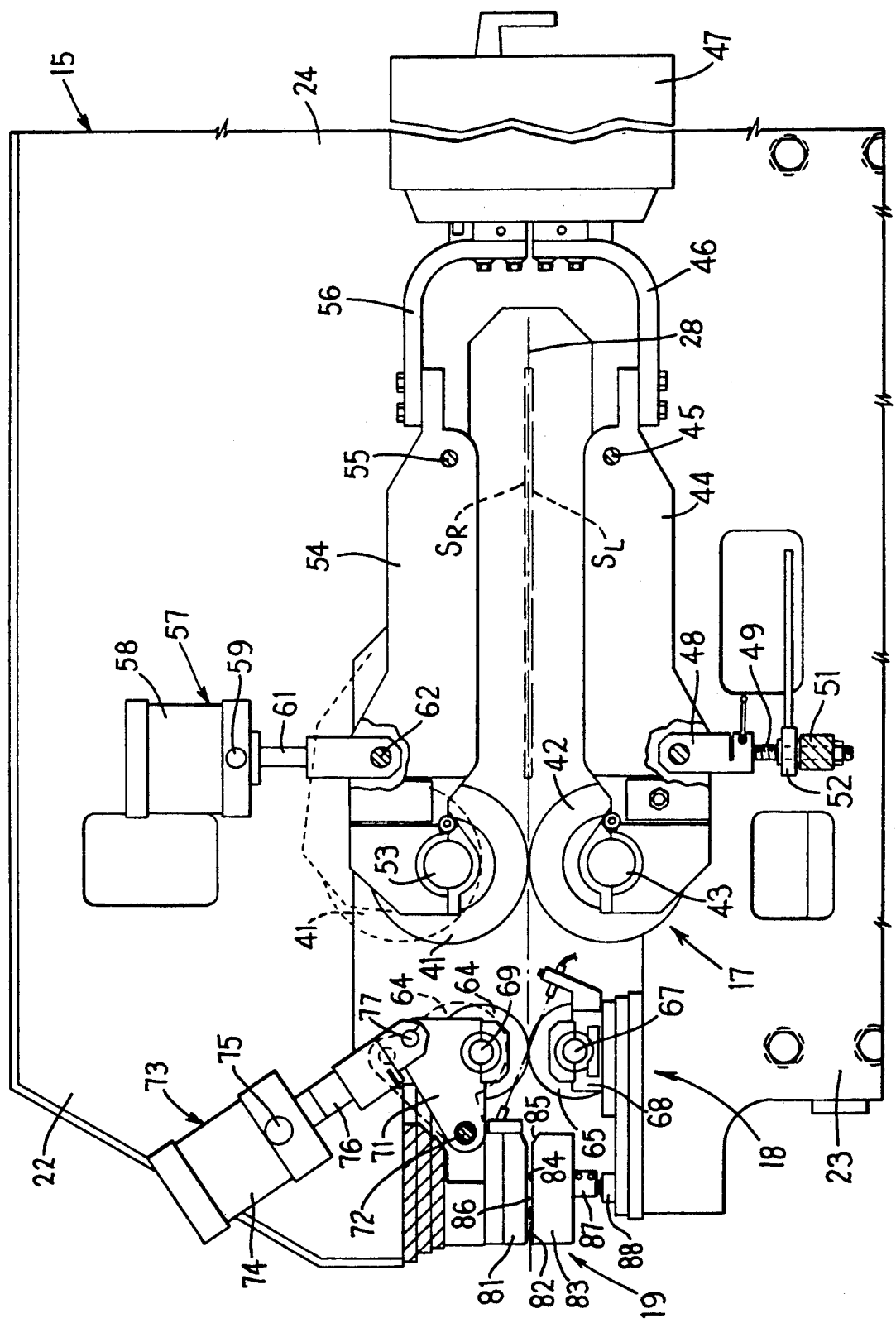
FIG. 4 is an enlarged, fragmentary side view of the movable sheet splicing mechanism.

The splicing mechanism 14, as indicated in FIG. 4, mounts thereon a weld assembly 17 which creates a mash seam weld along the overlapping edges of the sheets, a planish assembly 18 disposed adjacent the weld assembly for effecting compression and hence reduction in the thickness of the seam weld, and a gripper assembly 19 for gripping the spliced sheet to effect discharge thereof forwardly of the apparatus.

Figure 5:
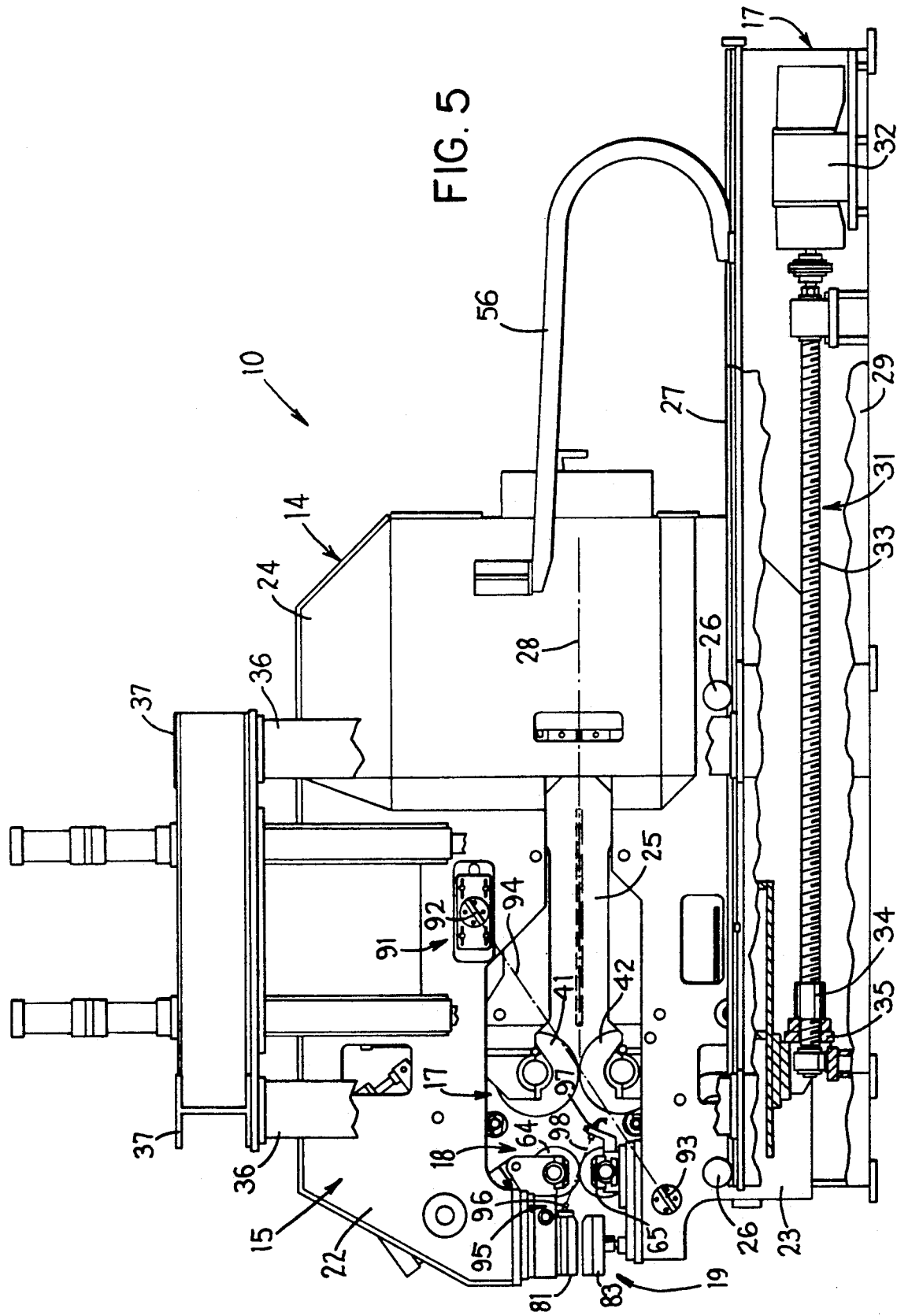
FIG. 5 is a fragmentary side elevational view showing the sheet splicing mechanism and its relationship to the support frame.

Referring to FIGS. 4 and 5, the frame or carriage 15 of the sheet splicer mechanism 14 is of a generally C-shaped construction which is disposed so that the C configuration is in a vertical orientation but the opening between the legs opens horizontally. More specifically, the C-shaped carriage 15 includes generally parallel upper and lower legs 22 and 23 which are vertically spaced apart and substantially horizontally elongated. These upper and lower legs are rigidly joined adjacent their rearward ends by a vertically extending bight 24. The C-shaped carriage thus defines a horizontally elongate open region or space 25 which is defined vertically between the upper and lower legs and which not only opens sidewardly in the right and left directions, but also horizontally forwardly (leftwardly in FIGS. 4 and 5).

The C-shaped support carriage 15 mounts, on opposite sides thereof, cooperating pairs of support rollers 26 (FIG. 3) which rollingly and guidingly engage upper and lower surfaces defined on horizontally elongate rails 27 which are fixed to the frame 16 and extend horizontally in the front-to-back direction thereof. This relationship enables the splicing mechanism 14 to be generally horizontally displaced in a back-and-forth manner relative to the frame, which reciprocating linear displacement is parallel to a central horizontal plane 28 which passes through the nips defined by the weld and planish assemblies.

The carriage 15 is linearly moved by a drive mechanism 31 (FIG. 5) which includes a conventional reversing-type drive motor 32 supported in the base portion 29 of the frame 16. This drive motor 32 is coupled to a horizontally elongate drive shaft 33 which is in screw-thread engagement with a drive nut 34, the latter being fixedly and nonrotatably connected to a flange 35 which is fixed to the lower carriage leg 23. Upon energization of drive motor 32, the C-shaped support carriage 15 can be horizontally moved either forwardly or rearwardly of the frame, depending upon the direction of rotation of the drive motor 32.

Figure 3:
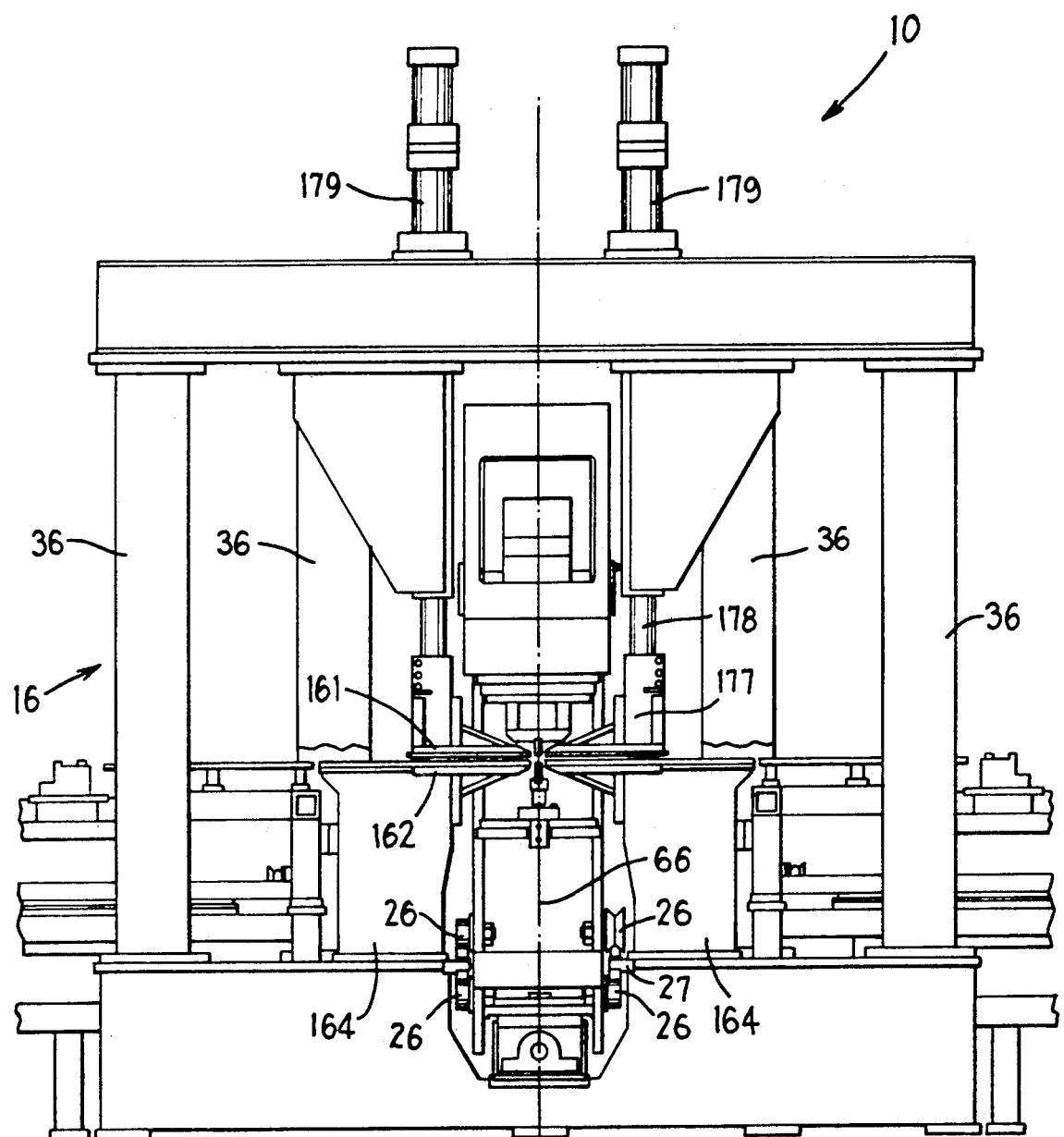
FIG. 3 is a fragmentary front elevational view of the apparatus.

The lower frame portion 29, as illustrated by FIG. 3, is a generally upwardly-opening U-shaped trough having an enlarged front-to-back slot or region which opens upwardly and accommodates therein the lower carriage leg 23. The stationary guide rails 27 are mounted on this lower frame portion 29 on opposite sides of the slot. The frame 16 also includes generally upwardly projecting support posts 36 which are fixed to the lower frame portion 29 and project upwardly on opposite sides of the splicer mechanism 14, with the upper ends of these posts 36 being rigidly joined by top beams 37 which extend horizontally across the top of the splicer mechanism 14. The frame thus defines a generally rectangular configuration which is vertically oriented and surrounds the C-shaped carriage 15 for purposes of strength and rigidity.

The support carriage 15 mounts thereon the weld assembly 17 (FIG. 4) which includes upper and lower weld rolls 41 and 42, respectively. These weld rolls 41 and 42 are constructed of a highly electrically conductive material, normally copper, so as to function as welding electrodes. The rolls 41 and 42 are each of narrow axial dimension relative to their diameter, and have generally cylindrical peripheral surfaces which are adapted to directly contact the overlapping edge portions of the sheets to permit performance of a seam welding operation. The rolls 41 and 42 are disposed for rotation about substantially horizontal axes, with the axes of the two weld rolls being generally parallel with one another.

The lower weld roll 42 is secured to a rotatable shaft 43 supported within a conventional conductive bearing which is secured to the free end of a vertically swingable support arm or lever 44, the latter being pivotally supported adjacent its other end on the lower carriage arm 23 by means of a pivot 45. A conventional electrically-conductive strap 46 is joined to the rearward end of the support arm 44, which arm itself is of a highly conductive material such as copper. The other end of strap 46 is joined to a conventional power supply unit such as a transformer 47.

The lower weld roll 42 is normally maintained stationary so that the upper peripheral surface thereof is at a predetermined elevation, but the axis of the weld roll can be vertically adjusted to compensate for wear or the like. For this purpose, the support arm 44 is pivotally connected to a nut member 48 which is threadably engaged with a rotatable screw shaft 49, the latter being threadably and rotatably supported on a stationary frame flange 51. A ratchet-type actuator 52 is rotatably engaged with the threaded shaft and can be suitably rotated, such as by a wrench or the like, to effect rotation of the threaded shaft when desired. Rotation of the threaded shaft, due to its threaded engagement with the nonrotatable nut 48, permits selected raising or lowering of the lower weld roll 42 to permit precise and selected adjustment into the elevation of the upper perimeter thereof.

The upper weld roll 41 is disposed with its shaft 53 rotatably supported by a conventional conductive bearing on the outer end of a further elongate support arm 54, the latter also being of an electrically conductive material such as copper. Support arm 54 at its rearward end is pivotally supported by a pivot shaft 55 on the upper carriage arm 22. The rearward end of support arm 53 is joined to a further electrically conductive strap 56 which also joins to the transformer 47.

The upper support arm 54 and the upper wheel weld roll 41 mounted thereon can be suitably moved between a raised inoperative position as indicated by dotted lines in FIG. 4 and a lowered operative or welding position wherein the upper wheel creates a compressive clamping engagement with the lower weld roll 42, substantially as indicated by solid lines in FIG. 4. For this purpose, an actuator 57 is coupled to the support arm 54 to control vertical swinging movement thereof. This actuator 57 preferably comprises a double-acting fluid pressure cylinder having the housing 58 thereof pivotally supported on the upper carriage arm 22, such as by a clevis or support shaft 59. A piston rod 61 is linearly displaceable relative to and projects downwardly from the housing 58 and has the lower free end thereof pivotally coupled at pivot 62 to the upper support arm 54.

The planish assembly 18 is disposed closely adjacent but slightly forwardly of the weld assembly 17 and includes upper and lower planish rolls 64 and 65, respectively, which rolls define a nip therebetween which is horizontally aligned with the nip between the weld rolls 41 and 42, which nips both lie substantially in the horizontal plane 28. That is, the upper perimeters of the conical peripheral surfaces of the lower weld roll 42 and the lower planish roll 65 are disposed substantially for tangential contact with this horizontal plane 28.

The upper and lower planish rolls 64 and 65 are disposed for rotation about axes which extend generally horizontally and in generally parallel relationship with one another, and the axes of the planish rolls extend substantially parallel with the rotational axes of the weld rolls. Planish rolls 64, 65 are also of relatively narrow axial thickness relative to their diameters, and the central axial planes of the planish rolls together with the central axial planes of the weld rolls 41, 42 are all substantially coplanar and define a common vertical plane 66 which extends centrally longitudinally in the front-to-back direction of the splicer mechanism 14.

The lower planish roll 65 has the support shaft 67 thereof rotatably supported by a suitable support bearing 68 which is fixedly mounted on the lower carriage arm 23. The upper planish roll 64 has the shaft 69 thereof rotatably supported on a substantially triangularly-shaped support arm 71 which effectively functions as a bell crank. This support arm 71, adjacent another corner thereof, is supported on the upper carriage arm 22 by a pivot shaft 72. This support arm 71 can be vertically swingably displaced by an actuator 73 which preferably comprises a double-acting fluid pressure cylinder having a housing 74 which is pivotally supported on the upper arm 22, as by a clevis 75. The extendible piston rod 76 of the pressure cylinder is pivotally coupled at 77 to the remaining corner of the swingable support arm 71. This pressure cylinder 71 can hence move the upper planish roll 64 between a raised inoperative position as indicated by dotted lines in FIG. 4, and a lower operative position as indicated by solid lines in FIG. 4. In this operative position, the upper planish roll 64 is urged downwardly into compressive engagement with the lower roll 65 to permit imposition of a high compressive pressure on the seam weld created between the overlapping edge portions of the sheets to effect significant flattening of the weld and reduction in the thickness thereof.

As also illustrated in FIG. 4, the sheet gripping mechanism 19 is disposed closely adjacent but forwardly of the planish assembly 18. This mechanism 19 includes a pair of vertically opposed gripping pads, namely upper and lower grip pads 81 and 83, respectively, for permitting gripping of the spliced sheet therebetween. The upper gripping pad 81 has a generally horizontal bottom surface 82 for gripping contact with an upper surface of the spliced sheet, and opposed thereto is a generally horizontal upper gripping surface 84 defined on the lower pad for direct contact with an under surface of the spliced sheet. These surfaces 82 and 84 are normally slightly vertically spaced to define a gap 86 therebetween which opens horizontally in all directions. The rearward sides of the gripping pads are preferably provided with tapered corners 85 which lead into the gap 86 to provide a guided entry of the spliced sheet into the gap. The upper pad 81 is fixedly mounted on the upper carriage arm 22, whereas the lower pad 83 is supported for limited vertical displacement relative to the lower arm 23. For this purpose, the lower pad 83 is joined to the piston rod 87 of a small double-acting pressure cylinder 88, the housing of which is fixedly mounted on the lower arm 23. Energization of the pressure cylinder 88 enables the lower pad 83 to be moved upwardly for engagement with the spliced sheet, with the upward movement being sufficient to effect slight upwardly lifting of the spliced sheet to permit it to be clampingly held between the upper and lower gripping pads. These gripping pads can be provided with elastomeric or protective surface coatings thereon if necessary or desirable.

The weld assembly 17 also includes a sensor means 91 (FIG. 5) for indicating when the metal sheet is present at the nip between the upper and lower weld rolls. This sensor means includes sensor parts 92 and 93 (such as a photocell and a receiver) mounted respectively on the upper and lower carriage arms 22 and 23. These sensor parts 92 and 93 emit a light beam along the sensor line 94, which line is positioned closely adjacent but sidewardly of the weld rolls, and intersects the horizontal central plane 28 substantially in sideward alignment with the nip between the weld rolls 41, 42. The light beam along the line 94 is interrupted when the metal sheet is present at the nip of the weld rolls.

In similar fashion, a further sensor means 95 is associated with the planish assembly 18 for determining the presence of a metal sheet between the planish rolls. This sensor means 95 also includes sensor parts 96 and 97 mounted on the upper and lower carriage arms 22 and 23, with the sensor parts conventionally being a photocell and a receiver. These sensor parts define a sensor line 98 which passes sidewardly adjacent the planish rolls and intersects the central plane 28 in substantially sidewardly alignment with the nip between the planish rolls to indicate the presence of a metal sheet in the nip whenever the light beam is interrupted.

As illustrated by FIGS. 4 and 5, the sheet gripper 19 is disposed directly adjacent the free ends of the carriage arms 22 and 23 to hence be located substantially at the mouth of the enlarged working space 25 defined between the upper and lower carriage legs. The planish assembly 18 is mounted directly adjacent but slightly rearwardly of the sheet gripper 19, and similarly the weld assembly 17 is mounted directly adjacent but slightly rearwardly of the planish assembly 18. All of these assemblies, however, are mounted more closely adjacent the front free ends of the legs 22 and 23, thereby leaving a substantially large portion of the working space 25 extending rearwardly away from the weld assembly 17. This region opens freely in both the rightward and sideward directions of the carriage 15 so as to receive therein the overlapping edge portions of the pair of sheets $S_R$ and $S_L$ when the sheet splicer mechanism 14 is disposed in its forwardmost position as illustrated by FIGS. 4 and 5.

Considering now the sheet support tables 11R and 11L, they are disposed on opposite sides of and project generally horizontally and perpendicularly away from the support carriage 15. These tables 11R and 11L are substantially identical to one another and are disposed on opposite sides of and in substantially mirror relationship relative to the central vertical plane 66. Only the table 11R will be described in detail since it will be understood that the opposite table 11L is structurally and functionally identical thereto.

Referring to FIGS. 6-9, the support table 11R includes a support frame 111 having various levels of longitudinally extending horizontal frame rails 112, 113 and 114 which are appropriately rigidly joined by numerous cross rails, with the overall frame being supported by legs 115. The frame 111, adjacent the forward or downstream end thereof (the end positioned more closely adjacent the movable splicing assembly 14) is provided with a generally planar sheet support 116 thereon. This sheet support 116 defines a generally horizontally enlarged and upwardly facing support surface for supporting the sheet as it is fed into the welding and splicing position. When the sheet is large, then this planar sheet support 116 also functions to support the sheet during the actual weld splicing operation.

The planar sheet support 116 is formed by a plurality of longitudinally extending guide plates 117 which are disposed in parallel but sidewardly spaced relation so as to define clearance slots 118 therebetween.

Figure 6:
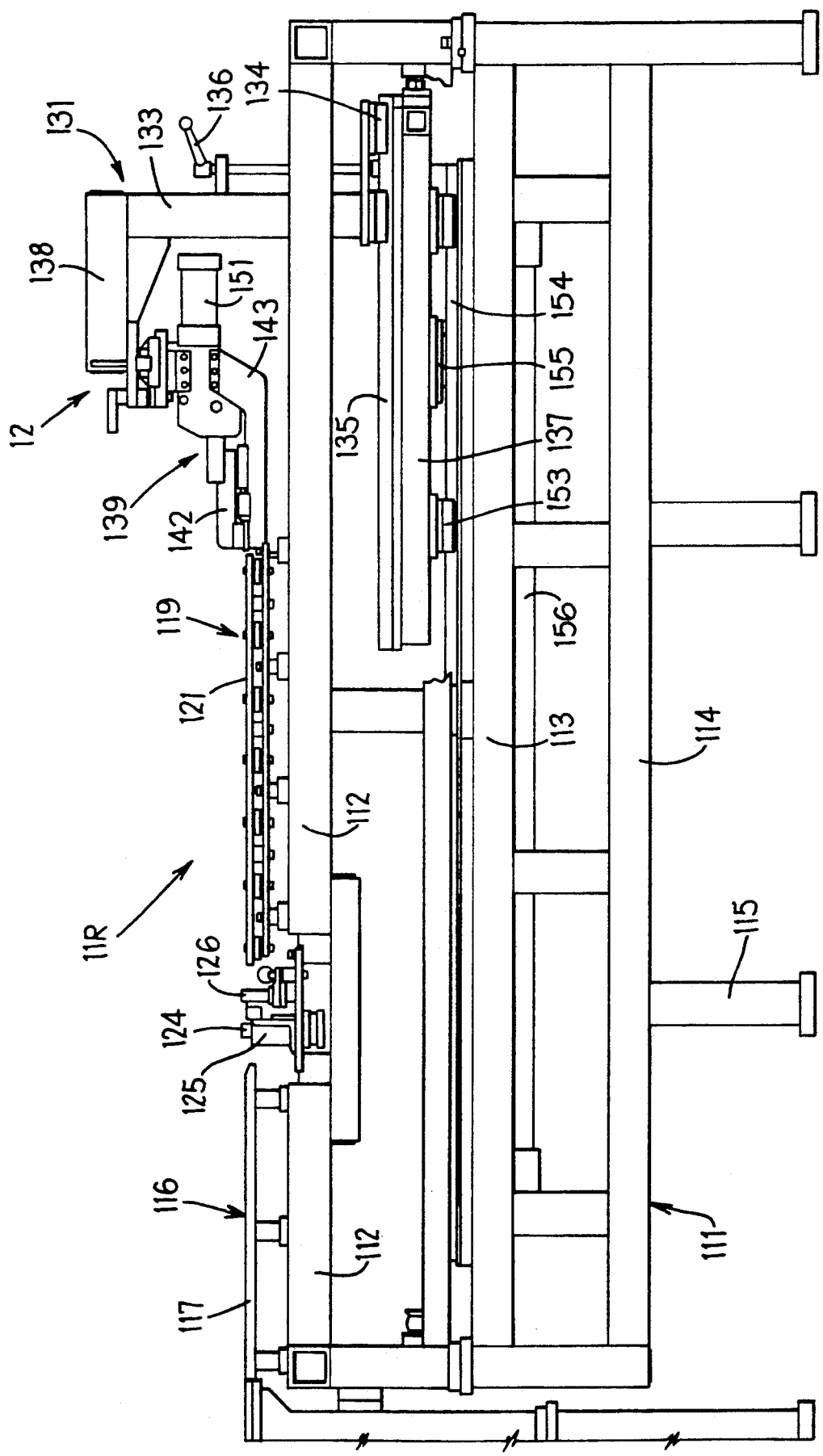
FIG. 6 is a front elevational view of the sheet advancing table arrangement provided on the right side of the sheet splicing mechanism.
Figure 8:
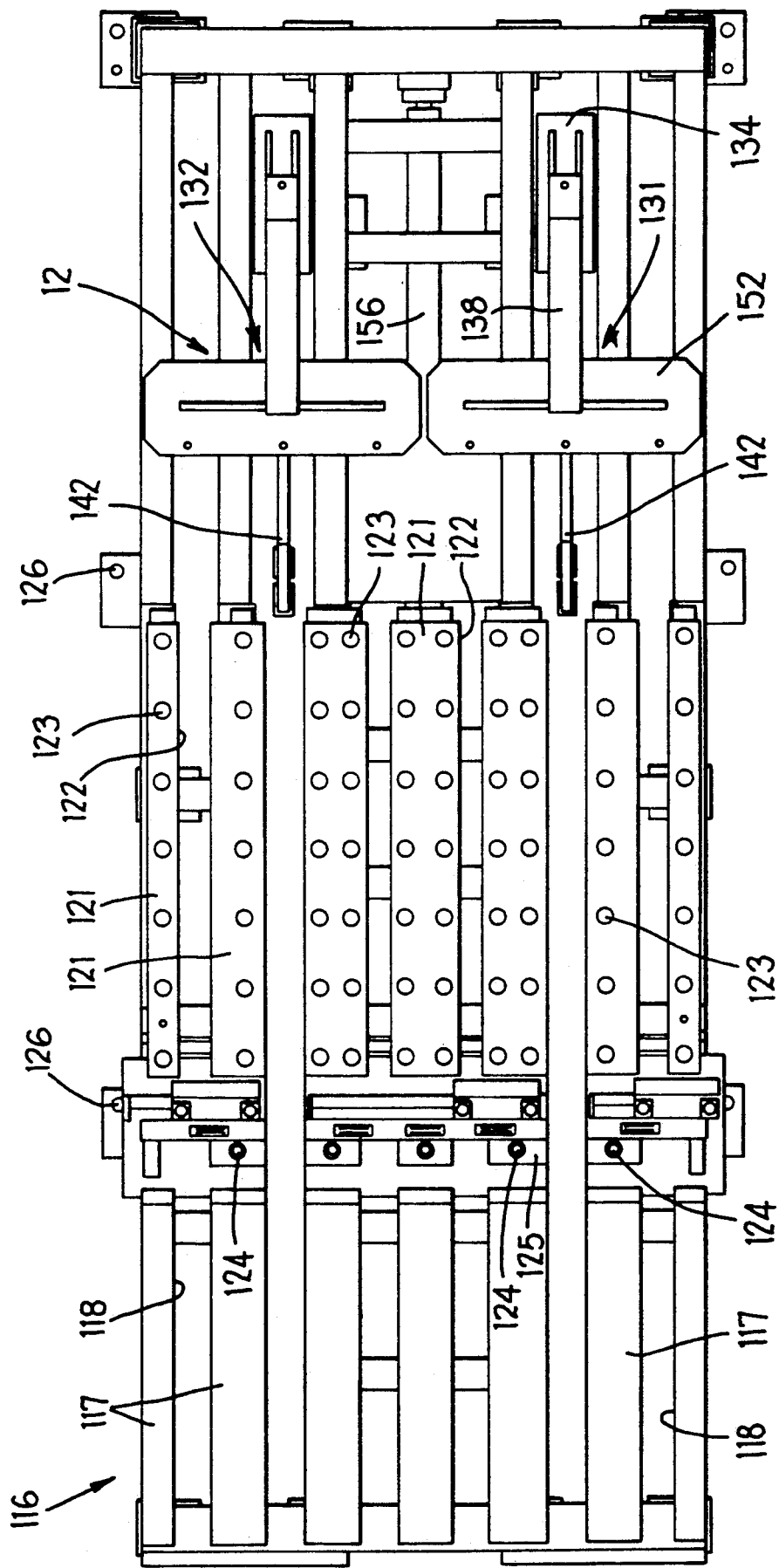
FIG. 8 is a top view of the table arrangement shown in FIG. 6.
Figure 9:
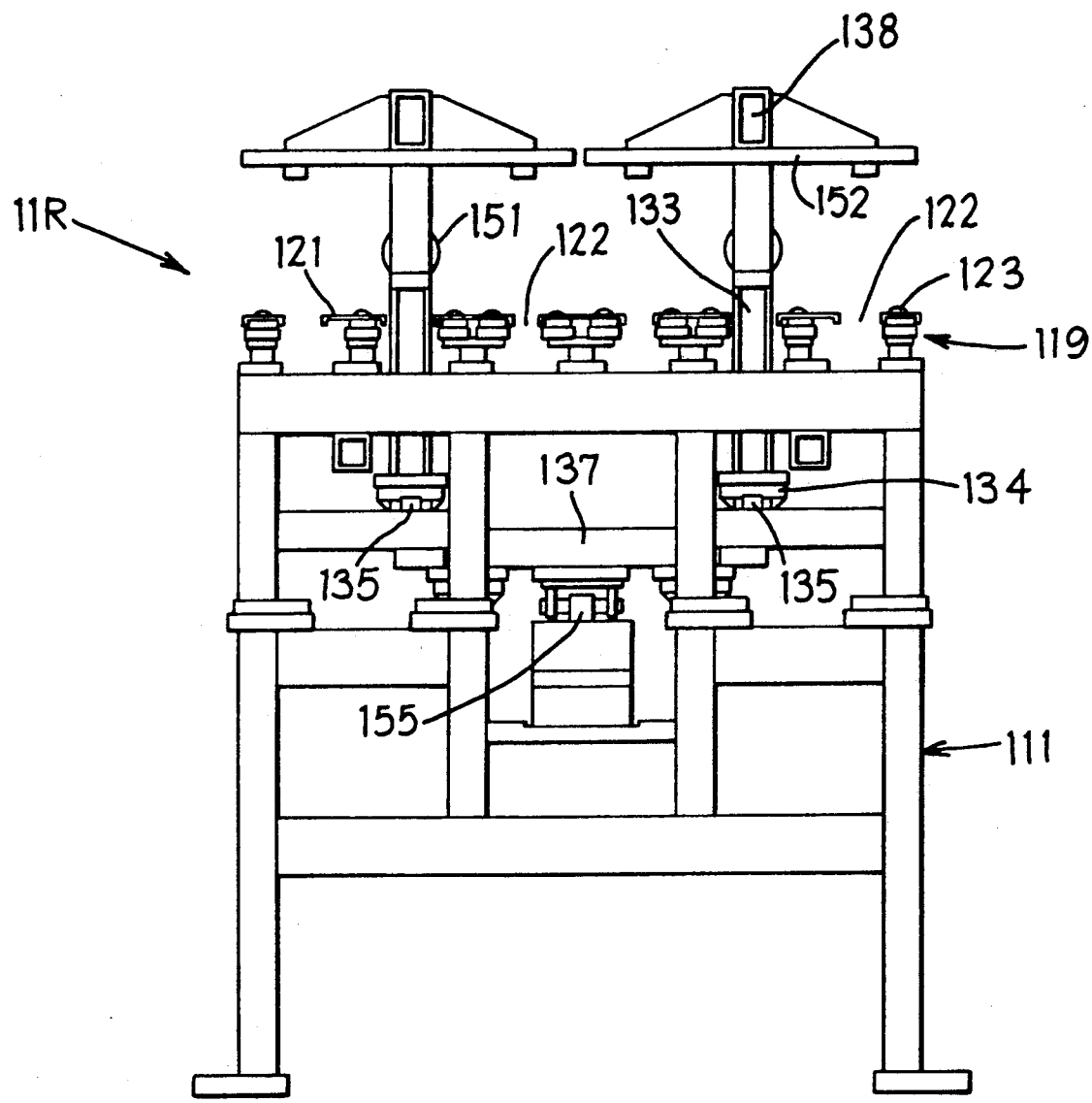
FIG. 9 is an end elevational view of the table arrangement shown in FIG. 6.

The sheet support table 11R also includes, as illustrated by FIGS. 6 and 8, a further planar sheet support 19 which is disposed upstream of and is substantially horizontally coplanar with the sheet support 116. This sheet support 119 is provided to permit positioning of a sheet thereon, including proper orientation and alignment of the sheet, prior to the sheet being fed to the splicing mechanism 14. For this purpose, the sheet support 119 includes a plurality of generally parallel support rails 121 which are disposed in sidewardly spaced relation to define elongate clearance slots 122 therebetween, whereby the rails 121 and associated slots 122 are substantially longitudinally aligned with the respective guide plates 117 and slots 118.

Each of the support rails 121 has a plurality of support balls 123 freely rotatably supported longitudinally therealong, which balls project slightly upwardly above the rails so that the balls define a horizontal support plane for the sheet.

The table 11R is also provided with a plurality of stop pins 124 disposed substantially in a row which extends perpendicularly across the table, which row of stop pins 124 is located between the supports 116 and 119 and is sidewardly spaced a predetermined distance from the central plane 66. Each stop pin 124 is vertically extendible and contractible by a suitable actuator 125, such as a solenoid-type actuator. The stop pins 124, when vertically raised, project slightly upwardly above the sheet-supporting plane defined by the balls 123, whereby the leading edge of the sheet is abutted against the stop pins 124 to permit proper location of the sheet in the moving direction. The sheet is also properly oriented sidewardly by abutting one edge thereof against suitable alignment pins 126 which are disposed along one side of the sheet support and project slightly upwardly above the sheet-supporting plane.

The stop pins 124 are retracted downwardly when advancing of the sheet toward the splicing mechanism 14 is desired. To effect such forward (leftward in FIG. 8) advancing of the sheet, the support table 11R mounts thereon the movable sheet advancing mechanism 12. This latter mechanism includes a pair of substantially identical reciprocating drivers 131 and 132 which are disposed in sideward relationship relative to the table, and are adapted for driving engagement with the sheet disposed on the sheet support 119.

The reciprocating driver 131 includes an upright carrier 133 having a guide structure 134 at the lower end thereof which is slidably supported on an elongate rail 135, the latter projecting horizontally in generally perpendicular relationship to the central vertical plane 66. The guide 134 permits the upright carrier 133 to be selectively positionally adjusted along the rail 135, and then suitably fixed in that selected position by means of a clamp 136. The upright carrier 133 has a top carrier element 138 which is spaced upwardly above the table and projects forwardly in overhanging relationship, and mounts thereunder a sheet clamping assembly 139 for clamping engagement with the sheet adjacent the rear edge thereof.

This sheet clamping assembly 139, mounted on a bracket arrangement 141 (FIG. 7) which is fixedly mounted under the top carrier element 138, includes upper and lower clamping arms 142 and 143 which are mounted on and project forwardly from the bracket arrangement 141. The lower clamp arm 142 is generally L-shaped and has a generally vertical leg which is fixed to the bracket 141 and projects downwardly therefrom, and joins to a horizontally elongate leg which projects forwardly and has a clamping pad 144 secured adjacent the free end thereof. Pad 144 defines thereon an upwardly facing clamping surface. This lower clamp arm 143 has the horizontally and forwardly extending arm portion disposed below the support plane for the sheet, and the arm is of narrow sideward extent so as to be movable longitudinally of the table along the aligned slots 118 and 122.

Lower clamping arm 143 also has a biasing member 145 secured thereto, which member 145 projects upwardly above the support plane for the sheet, and has a forwardly facing but sloped end or cam surface which is adapted to abut the rear edge of the sheet. This member 145 is mounted for limited slidable movement along the lengthwise extent of the arm, and is normally urged forwardly (leftwardly in FIG. 7) away from a block 146 by an intermediate spring 140.

The upper clamping arm 142 is elongated and has a clamp pad 147 mounted adjacent the free end thereof. The clamp pad 147 defines thereon a bottom surface which is adapted to be positioned directly over the lower clamp pad 144 for permitting clamping of the sheet therebetween. The other end of the upper clamping arm 142 is swingably mounted on the bracket arrangement 141, as by a transversely-extending horizontal pivot 148, whereby the upper clamp arm 142 can be swingably moved between a lower clamping position substantially as illustrated by solid lines in FIG. 7, and a raised release position substantially as indicated by dotted lines in FIG. 7. This upper clamping arm 142 has a rear arm portion 149 which projects generally upwardly from the pivot and is pivotally coupled to an actuator 151. This actuator 151 preferably comprises a double-acting fluid pressure cylinder, having a housing which is fixedly secured to the bracket arrangement 141, and a reciprocal piston rod which projects forwardly and is pivotally coupled to the arm portion 149 to effect swinging of the upper clamping arm 142.

To permit the clamping assembly 139 to be sidewardly adjusted for location at discrete positions, the upper carrier element 138 has a sidewardly elongated securement plate 152 fixed thereunder. This securement plate 152 enables the bracket arrangement 141 to be fixed thereto at one of several discrete sidewardly-spaced locations, which locations are disposed to permit the clamping assembly to be oriented so that the lower clamp arm 143 is aligned for movement along one of the slots 122.

The other reciprocating driver 132 is identical to the driver 131 described above, except that the drivers 131 and 132 can be independently adjustably positioned along the respective support rail 135, following which the drivers 131 and 132 are both fixedly secured to the rails 135 and hence linearly movable as a unit.

To effect forward and backward movement of the clamping assemblies, the carriage 137 is provided with guides 153 thereunder disposed for horizontal sliding engagement with a pair of sidewardly spaced, horizontally elongate guide rails 154, the latter being fixed to the frame. This enables the carriage 137 to be horizontally slidably reciprocated back-and-forth along a direction which is generally perpendicular to the central plane 66. To effect movement of the carriage 137, it has a connector 155 projecting downwardly from the bottom side thereof and connected to a reciprocating drive unit 156. The reciprocating drive unit 156 preferably comprises a conventional double-acting pressure cylinder of the rodless type, whereby the connector 155 joins directly to the piston of the cylinder. This rodless cylinder 156 has the housing thereof fixed to the frame and extending horizontally in the elongate direction thereof.

Figure 10:
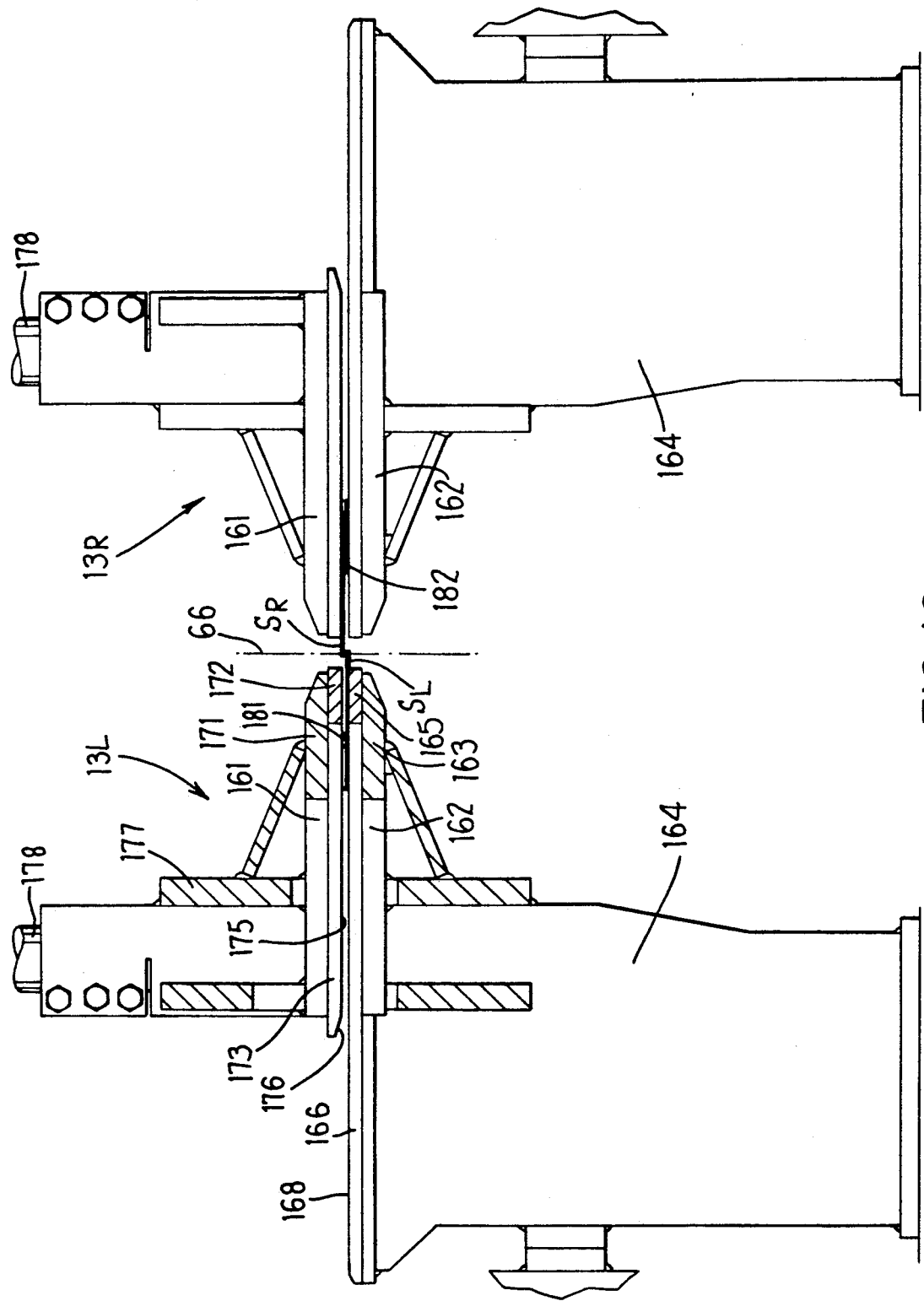
FIG. 10 is a front elevational view, partially in cross section, and showing the sheet clamping assemblies disposed on opposite sides of and positioned for cooperation with the movable sheet splicing mechanism.
Figure 12:
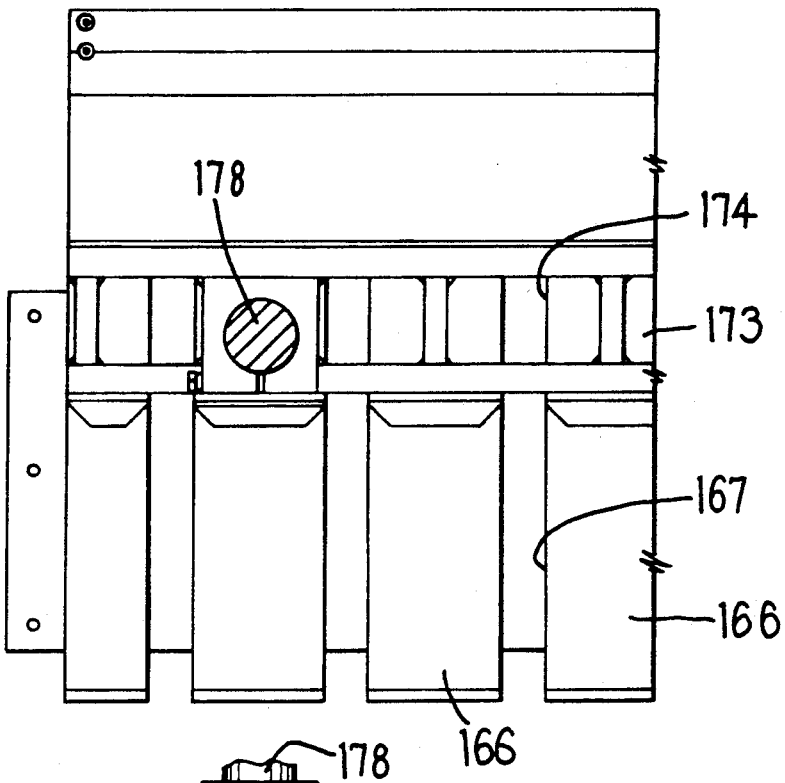
FIG. 12 is a top view of the arrangement shown in FIG. 11.
Figure 11:
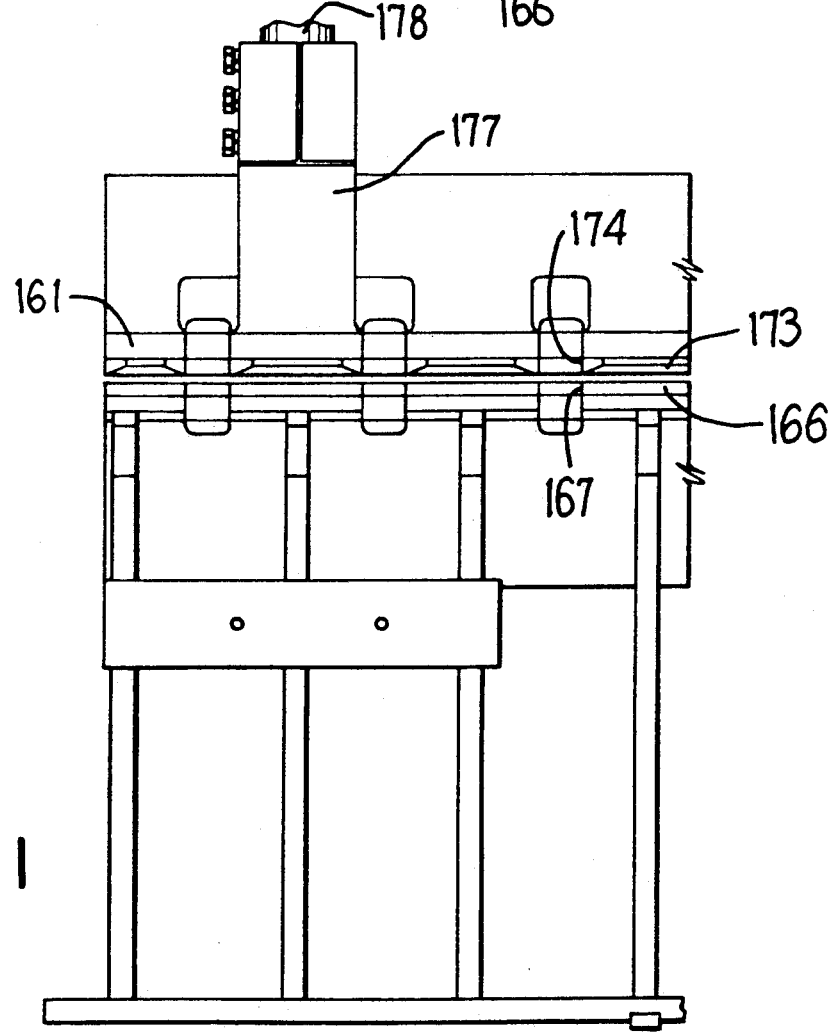
FIG. 11 is a fragmentary end elevational view of the clamping assembly shown in FIG. 10.

Referring now to FIGS. 10-12, there is illustrated the sheet clamping mechanisms 13R and 13L which are disposed directly downstream of the sheet support tables 11R and 11L, respectively. These sheet clamping mechanisms 13R and 13L are substantially identical and are disposed closely adjacent and on opposite sides of the central vertical plane 66.

Each of the sheet clamping mechanism 13R and 13L includes upper and lower sheet clamps 161 and 162, respectively, which define a horizontally enlarged narrow gap therebetween for accommodating the respective metal sheet.

The lower sheet clamp 162 comprises a generally horizontally enlarged clamp plate 163 which is fixedly secured to and projects horizontally sidewardly in cantilevered relationship from a tablelike support frame 164, which frame 164 is fixedly related relative to the other frames of the overall apparatus. The clamp plate 163 has a platelike clamping jaw 165 fixed to the upper surface thereof. Jaw 165 is disposed generally in a horizontal plane and is elongated parallel to but is spaced only sidewardly from the central plane 66 by a small distance. This clamping jaw 165 defines thereon a substantially horizontal upper surface which is adapted for direct clamping engagement with the underside of a metal sheet.

The lower sheet clamp 162 also includes a plurality of jaw portions 166 which project horizontally rearwardly away from but are substantially coplanar with the clamping jaw 165. These jaw portions 166 are fixed relative to the frame 164 and are defined by a plurality of platelike portions which extend in parallel but sidewardly spaced relationship so as to define slots 167 therebetween, whereby the jaw portions 166 and slots 167 are horizontally aligned and substantially coextensive with the guide plates 117 and intervening slots 118. These jaw portions 166 define an upper substantially planar horizontal surface 168 which is coextensive with the upper surface of the clamping jaw 165 for direct engagement with the underside of the metal sheet.

The upper sheet clamp 161 is of generally similar construction and includes a generally horizontally enlarged clamp plate 171 which is substantially horizontally coextensive with the lower clamp plate 163. This upper clamp plate 171 has a top clamp jaw 172 fixed to the underside thereof and disposed so that the horizontal lower surface thereof is disposed directly over the lower clamp jaw 165 to permit secure clamping of the metal sheet therebetween. Jaw portions 173 are fixed to the clamp plate 171 and project rearwardly away from the upper clamp jaw 172. These jaw portions 173 are defined by a plurality of narrow plates which extend perpendicularly away from the plane 66, with these plates 173 being disposed in parallel but sidewardly spaced relation to define narrow slots 174 therebetween. The free ends of these plates (the end remote from the central plane 66) has a tapered or flared surface 176 to guide entry of the metal sheet into the gap between the upper and lower sheet clamps. These upper jaw portions 173 define thereon a generally horizontal bottom surface 175 which is coextensive with the clamping surface on the upper clamp jaw 172 so as to permit engagement with the upper surface of the metal sheet.

The upper sheet clamp 161 is fixedly secured to a bracket structure 177 which is joined to the lower ends of a pair of vertically extending guide rods 178. These guide rods are disposed in sidewardly spaced but parallel relationship. Guide rods 178 project vertically upwardly and are suitably slidably supported on the frame, and are respectively joined to downwardly projecting piston rods associated with double acting fluid pressure cylinders 179 (FIG. 3) which are mounted on the upper frame beam 37.

The upper sheet clamp 161 of the mechanism 13L has a rounded deflector 181 mounted thereon in close proximity to the top jaw 172 and projecting downwardly below the clamping surface 175. This rounded deflector 181 is spring urged downwardly toward the opposed surface 168. The deflector 181 preferably comprises a plurality of buttonlike elements disposed at spaced intervals longitudinally along the jaw, and each having a convex rounded surface similar to a partial sphere for ensuring 10 that the sheet $S_L$ is held downwardly against the lower clamp jaw 165.

The other clamping mechanism 11R has a similar rounded deflector 182 associated therewith, although the deflector 182 is mounted on the lower clamp member 162 and is spring urged upwardly toward the upper clamp member 161. The construction of this rounded deflector 182 is otherwise the same as the deflector 181. Deflector 182 causes the leading edge of the sheet $S_R$ to be deflected upwardly adjacent the undersurface of the top jaw, thereby ensuring that the edges of the sheets $S_R$ and $S_L$ will properly vertically overlap, as depicted in FIG. 10.

While the operation of the splicing apparatus 11 of the present invention is believed apparent from the description given above, nevertheless same will be briefly described below to ensure a complete understanding thereof.

When a work cycle is to be initiated, the splicing mechanism 14 is initially in a front position substantially as shown in FIG. 5, and the upper weld roll 41 is in a lower position wherein it is pressingly engaged with the lower weld roll 42 by the pressure cylinder 57. The upper planish roll 64 is also in a lower position wherein it engages the lower planish roll 65, but is subjected only to a low holding pressure by the cylinder 73.

Figure 7:
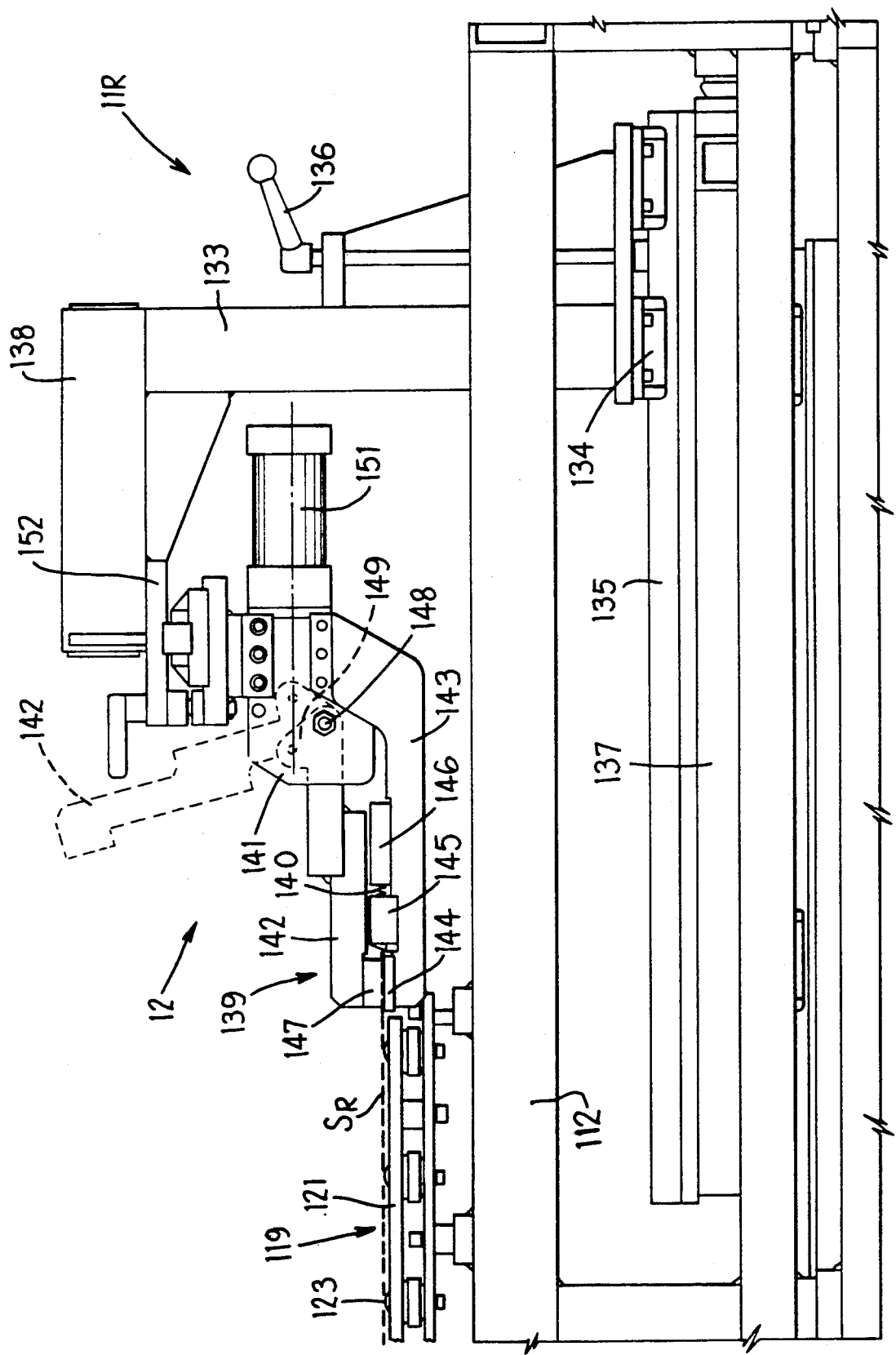
FIG. 7 is an enlargement of a portion of FIG. 6.

To initiate a cycle of operation, a pair of metal sheets $S_R$ and $S_L$ to be spliced are positioned, normally manually, on the planar supports 119 associated with the right and left tables 11R and 11L. The sheets are positioned so that the leading edges effectively abut the stop pins 124, and the one side edges abut the side stops 126, whereby the sheets are in predetermined positions. Prior to initial positioning of the sheets, the drivers 131 and 132 are each adjusted relative to the respective rail so that the urging members 145 are positioned so as to be adjacent the rear edge of the respective sheet. In fact, when the operator positions the sheet in the table, the rear edge of the sheet engages the cammed front edge of member 145 and displaces it slightly rearwardly against the urging of spring 140, which spring 140 acting through member 145 then resiliently maintains the front edge of the sheet abutted against the row of stop pins 124. The clamping mechanisms 139 are then activated so that the upper clamp arms 144 swing downwardly so that each sheet, adjacent the rear edge, is clampingly held between the opposed clamped pads 144 and 147 substantially as illustrated by FIG. 7. The stop pins 124 are then retracted downwardly, and the cylinders 156 associated with both tables are energized so that both sheets $S_R$ and $S_L$ are simultaneously advanced forwardly through a predetermined distance toward the splicing assembly 14, which assembly 14 is disposed in or adjacent its forwardmost position.

The advancing of the sheets causes the leading edges of the sheets to be fed into the open clamp assemblies 13L and 13R, with the leading edge of the one sheet $S_R$ being deflected upwardly by the deflector 182. The sheets are advanced a predetermined distance until the leading edges slightly penetrate the central plane 66 whereby the leading edge portions of the sheet are disposed in slight vertical overlapping relationship, substantially as illustrated by FIG. 10, although the horizontal extent of the overlap is small. The drivers 131 and 132 are then stopped, and the cylinders 179 are energized so that the upper clamps 161 are moved downwardly whereby the clamping assemblies 13R and 13L thus fixedly and securely hold the sheets in the position wherein the leading edges are overlapped. The cylinders 151 of the clamp mechanisms 139 are reversely energized to open the top clamp arms 142, and the cylinders 156 are immediately reversely energized to return the drivers 131 and 132 back to their original positions so as to permit additional sheets to be positioned on the tables.

After the sheets have been clamped in the splicing position illustrated by FIG. 10, then the splicing assembly 14 is moved rearwardly by energization of the motor 32. When the sensor 91 senses the front edge of the sheets entering the nip of the weld rolls 41 and 42, then electrical energy is applied to the rolls and effects creation of a seam weld along the overlapping edges in a conventional manner during rearward movement of the weld rolls along the overlapping edges. After the weld rolls 41, 42 begin their movement along the overlapping edges, the front edges of the sheets begin to enter the nip of the planish assembly, which edge is sensed by the sensor 95 which in turn controls a valve so as to supply high pressure fluid to the upper end of pressure cylinder 73. This creates a high compressive force urging the upper roll 64 down toward the lower roll 65, which compressive force is significantly greater than that created between the weld rolls, whereupon the weld is hence compressed and mashed (i.e., its thickness reduced) as the planish rolls 64, 65 move along the weld toward the rear edge of the sheet.

When the weld rolls reach the rear edge of the sheet so that the sheet begins to leave the nip between the weld rolls, the sensor 91 now senses the absence of the sheet, and causes electrical deenergization of the weld rolls and reverse energization of cylinder 57 to move the weld roll 41 upwardly. In similar fashion, the other sensor 95 senses the departure of the sheet from the nip between the planish rolls, thereby causing upward energization of cylinder 73 to raise the upper planish roll 64. The rearward linear movement of the carriage 15 is then stopped, and substantially simultaneously therewith the gripper 19 is energized to move the lower grip pad 83 upwardly to effect clamping of the sheet adjacent the rear edge thereof between the gripping pads 81 and 83. Motor 32 is then reversely energized to drive the splicing assembly 14 forwardly back to its original position, during which movement the spliced sheet is also discharged forwardly due to its being gripped by the gripper assembly 19. This causes the spliced sheet to be displaced forwardly whereby it can be either manually discharged or moved onto a suitable discharge device such as a conveyor. When the splicer mechanism 14 reaches its forwardmost position, the gripper 19 is deenergized so as to move lower gripper pad 83 downwardly to release the spliced sheet, and upper weld roll 41 and upper planish roll 64 are returned to their lower positions.

The cycle of splicing the two sheets together has now been completed and the apparatus is again back to its original position so as to permit initiation of a new cycle. During the operation of the prior cycle, operators will already have clampingly positioned two new sheets on the planar supports 119 so that the next cycle of operation can be initiated (i.e., the forward advance of the sheets) as soon as the splicing mechanism 14 has returned sufficiently forwardly as to permit inward movement of the next pair of sheets.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for splicing together a pair of metal sheets by creating a mash seam weld along overlapping edge portions of the pair of sheets, comprising:

frame means;

a splicing mechanism for creating a mash seam weld along vertically overlapping edge portions of the pair of metal sheets, said splicing mechanism including a carriage movably supported on said frame means for substantially horizontal linear movement;

drive means coupled to said carriage for causing substantially horizontal back and forth movement of said carriage relative to said frame means along a predetermined line of movement;

said splicing mechanism including a welding assembly mounted on said carriage for creating a seam weld along the overlapping edge portions of the pair of sheets as the carriage moves in a first direction along the line of movement, said weld assembly including opposed upper and lower weld rolls which define a weld nip therebetween which is aligned with said line of movement;

said splicing assembly also including a planishing assembly mounted on said carriage for effecting mashing of the seam weld created by the weld assembly, said planishing assembly including opposed upper and lower planishing rolls defining therebetween a planishing nip which is aligned with said line of movement;

first and second sheet-supporting table assemblies positioned respectively on opposite sides of said splicing mechanism so as to respectively project substantially horizontally outwardly in opposite directions from a central vertical plane which contains said line of movement;

each of said table assemblies including means defining thereon a substantially horizontally enlarged and upwardly facing sheet supporting structure for permitting a substantially flat metal sheet to be disposed in a predetermined position thereon;

sheet-advancing means associated with each said table assembly for substantially horizontally moving the sheet from said predetermined position to a splicing position wherein a leading edge of the sheet is disposed closely adjacent said central vertical plane, the sheet-advancing means associated with said first and second table assemblies causing the metal sheets on the first and second table assemblies to be moved inwardly toward one another and toward said central plane until leading edges of the sheets vertically overlap through a small horizontal extent substantially at said central plane;

first and second clamping assemblies provided adjacent but on opposite sides of said central vertical plane and respectively associated with said first and second table assemblies for fixedly clamping the respective sheet when in the splicing position; and control means for activating the splicing mechanism to effect movement thereof in one direction along said line of movement when said sheets are clamped in said splicing position to permit engagement of the overlapping edge portions of the sheets by the weld and planish assemblies to create a mash seam weld therealong.

2. An apparatus according to claim 1, wherein said carriage includes a substantially rigid vertically-oriented C-shaped frame having a vertical bight part joined to rearward ends of top and bottom leg parts which are horizontally elongated and define vertically therebetween a horizontally elongated working space which opens both forwardly and sidewardly in opposite directions, said upper and lower planish rolls being mounted on the respective upper and lower leg parts adjacent front free ends thereof, said upper and lower weld rolls being mounted respectively adjacent but slightly rearwardly of the upper and lower planish rolls, said weld rolls being positioned horizontally forwardly a substantial distance from said bight part to define therebetween a horizontally elongated sheet overlap region which opens sidewardly in opposite directions and is substantially aligned with the predetermined positions defined on said first and second table assemblies when said splicing mechanism is in a front position.

3. An apparatus according to claim 2, wherein said control means actuates said weld and planish assemblies for engaging overlapped edge portions of the sheets at said overlap region to respectively weld and planish the edge portions as the carriage moves rearwardly toward a rear position, and gripping means mounted on the carriage for engaging the spliced sheet and movably discharging the spliced sheet forwardly from the splicing position as the carriage moves from its rear position towards its front position.

4. An apparatus according to claim 3, wherein the gripping means includes generally opposed top and bottom gripping members which are relatively vertically movable for gripping the spliced sheet therebetween, said top and bottom gripping members being respectively mounted on said upper and lower leg parts adjacent the front free ends thereof in forwardly spaced relationship from the respective upper and lower planish rolls.

5. An apparatus according to claim 3, wherein the upper and lower weld rolls are supported for rotation about respective horizontal upper and lower axes which are substantially parallel and which substantially perpendicularly intersect said central plane, means mounting one of said weld rolls on the respective leg part for vertical displacement between operative and inoperative positions, and activating means for moving said one weld roll between said operative and inoperative positions and for pressing said one roll toward the other weld roll to create a compressive engagement with the overlapping sheet portions disposed between the weld rolls when in said operative position; and said upper and lower planish rolls being supported for rotation about respective horizontal upper and lower axes which are substantially parallel and which substantially perpendicularly intersect said central plane, means mounting one said planish roll on the respective leg part for vertical displacement between operative and inoperative positions, and activating means for moving said one planish roll between said operative and inoperative positions and for pressing said one planish roll toward the other said planish roll to create a compressive engagement on the overlapping sheet portions disposed between the planish rolls when in said operative position.

6. An apparatus according to claim 5, wherein said gripping means includes opposed top and bottom gripping members which are respectively mounted on the upper and lower leg parts adjacent the front free ends thereof in forwardly spaced relation from the respective upper and lower planish rolls, said lower clamp member being supported for vertical displacement relative to the lower leg part for movement between a lowered operative position and a raised operative position for permitting gripping of the spliced sheet between the upper and lower gripping members.

7. An apparatus according to claim 2, wherein each of the first and second clamp assemblies includes upper and lower clamping members defining thereon horizontally enlarged clamping surfaces which are disposed in adjacent but vertically opposed relationship, the upper clamping member being vertically movable between a raised nonclamping position and a lowered clamping position, and pressure means coupled to said upper clamping member for activating same between said raised and lowered positions.

8. An apparatus according to claim 7, wherein said frame includes a top frame member disposed above and extending transversely across the upper leg part and rigidly joined to vertical frame members disposed on opposite sides of said splicing mechanism, whereby said frame means defines a generally open ring-shaped frame arrangement which is disposed vertically in surrounding relationship to the splicing mechanism, and said pressure means being mounted on said top frame member.

9. An apparatus according to claim 7, wherein said first clamping assembly has means associated therewith for holding a leading edge of the respective sheet downward in engagement with the lower clamping surface as the respective sheet is fed into the splicing position, and the second clamping assembly having means associated therewith for holding a leading edge of the respective sheet upwardly adjacent the upper clamping surface as the sheet is fed into the splicing position so as to permit the leading edges of the sheets to be vertically displaced and overlapped.

10. An apparatus according to claim 9, including gripping means mounted on said carriage for engaging the spliced sheet and movably discharging the spliced sheet forwardly from the splicing position as the carriage moves from a rear position toward the front position.

11. An apparatus according to claim 2, wherein each of said first and second table assemblies includes means for aligning the respective sheet at the predetermined position and including retractable stops for engaging a leading edge of the sheet at said predetermined position.

12. An apparatus according to claim 2, including stop means cooperating with each said table assembly for abutting a leading edge of the sheet supported on the respective table assembly for accurately pre-positioning the leading edge of the sheet at a location spaced a predetermined sideward distance from the central vertical plane, biasing means associated with each said sheet-advancing means for engaging the respective sheet and normally urging the leading edge of the sheet into abutting engagement with the stop means, and actuator means coupled to said stop means for selectively moving said stop means into a retracted position wherein said stop means is disengaged from the leading edge of the sheet to permit advancing of the sheet toward the central vertical plane.

13. An apparatus according to claim 2, wherein said sheet advancing means includes a sheet clamping mechanism having upper and lower clamp members for holding the sheet therebetween to permit forward advancing of the sheet toward the splicing position, said lower clamping member being fixedly supported on a support which is linearly movably supported for movement substantially perpendicularly with respect to the central plane, the lower clamp member including a clamping portion which is normally disposed under the sheet supporting plane defined at said predetermined position, and said upper clamping member being mounted on said support for vertical displacement between a raised inoperative position permitting a sheet to be disposed at said predetermined position and a lowered operative position wherein the sheet at said predetermined position is clampingly held between the upper and lower clamp members.

14. An apparatus according to claim 13, including adjustment means coupled between said clamping mechanism and said support for permitting the position of the clamping mechanism to be adjusted relative to the support substantially parallel to the movement direction of the support.

15. An apparatus for splicing together a pair of metal sheets by creating a mash seam weld along overlapping edge portions of the pair of sheets, comprising:
frame means;
a splicing mechanism for creating a mash seam weld along overlapping edge portions of the pair of metal sheets, said splicing mechanism including a carriage movably supported on said frame means for substantially horizontal linear movement;
drive means coupled to said carriage for causing substantially horizontal back and forth movement of said carriage relative to said frame means along a predetermined line of movement;
said splicing mechanism including a welding assembly mounted on said carriage for creating a seam weld along the overlapping edge portions of the pair of sheets as the carriage moves in a first direction along the line of movement, said weld assembly including opposed upper and lower weld rolls which define a weld nip therebetween which is aligned with said line of movement;
said splicing assembly also including a planishing assembly mounted on said carriage for effecting mashing of the seam weld created by the weld assembly, said planishing assembly including opposed upper and lower planishing rolls defining therebetween a planishing nip which is aligned with said line of movement;
first and second sheet-supporting table assemblies positioned respectively on opposite sides of said splicing mechanism so as to respectively project substantially horizontally outwardly in opposite directions from a central vertical plane which contains said line of movement;
said table assemblies including means defining thereon a substantially horizontally enlarged and upwardly facing sheet supporting structure for permitting substantially flat metal sheets to be disposed thereon and means for permitting substantially horizontal movement of the sheets to a splicing position wherein leading edges of the sheets vertically overlap through a small horizontal extent substantially at said central plane;
first and second clamping assemblies provided adjacent but on opposite sides of said central vertical plane and respectively associated with said first and second table assemblies for fixedly clamping the respective sheet in the splicing position; and
control means for activating the splicing mechanism to effect movement thereof in one direction along said line of movement when said sheets are clamped in said splicing position to permit engagement of the overlapping edge portions of the sheets by the weld and planish assemblies to create a mash seam weld therealong.

16. An apparatus according to claim 15, wherein said carriage includes a substantially rigid vertically-oriented C-shaped frame having a vertical bight part joined to rearward ends of top and bottom leg parts which are horizontally elongated and define vertically therebetween a horizontally elongated working space which opens both forwardly and sidewardly in opposite directions, said upper and lower planish rolls being mounted on the respective upper and lower leg parts adjacent front free ends thereof, said upper and lower weld rolls being mounted respectively adjacent but slightly rearwardly of the upper and lower planish rolls, said weld rolls being positioned horizontally forwardly a substantial distance from said bight part to define therebetween a horizontally elongated sheet overlap region which opens sidewardly in opposite directions and is substantially aligned with said first and second table assemblies when said splicing mechanism is in a front position.

17. An apparatus according to claim 16, wherein said control means actuates said weld and planish assemblies for engaging overlapped edge portions of the sheets at said overlap region to respectively weld and planish the edge portions as the carriage moves rearwardly toward a rear position, and gripping means mounted on the carriage for engaging the spliced sheet and movably discharging the spliced sheet forwardly from the splicing position as the carriage moves from its rear position towards its front position.

18. An apparatus for splicing together a pair of metal sheets by creating a mash seam weld along overlapping edge portions of the pair of sheets, comprising:
frame means;
a splicing mechanism for creating a mash seam weld along vertically overlapping edge portions of the pair of metal sheets, said splicing mechanism including a carriage movably supported on said frame means for substantially horizontal linear movement;
drive means coupled to said carriage for causing substantially horizontal back and forth movement of said carriage relative to said frame means along a predetermined line of movement;
said splicing mechanism including a welding assembly mounted on said carriage for creating a seam weld along the overlapping edge portions of the pair of sheets as the carriage moves in a first direction along the line of movement, said weld assembly including opposed upper and lower weld rolls which define a weld nip therebetween which is aligned with said line of movement;
first and second sheet-supporting table assemblies positioned respectively on opposite sides of said splicing mechanism so as to respectively project substantially horizontally outwardly in opposite directions from a central vertical plane which contains said line of movement;
each of said table assemblies including means defining thereon a substantially horizontally enlarged and upwardly facing sheet supporting structure for permitting a substantially flat metal sheet to be disposed in a predetermined position thereon;
sheet-advancing means associated with each said table assembly for substantially horizontally moving the sheet from said predetermined position to a splicing position wherein a leading edge of the sheet is disposed closely adjacent said central vertical plane, the sheet-advancing means associated with said first and second table assemblies causing the metal sheets on the first and second table assemblies to be moved inwardly toward one another and toward said central plane until leading edges of the sheets vertically overlap through a small horizontal extent substantially at said central plane;
first and second clamping assemblies provided adjacent but on opposite sides of said central vertical plane and respectively associated with said first and second table assemblies for fixedly clamping the respective sheet in the splicing position; and
control means for activating the splicing mechanism to effect movement thereof in one direction along said line of movement when said sheets are clamped in said splicing position to permit engagement of the overlapping edge portions of the sheets by the weld assembly to create a mash seam weld therealong.

19. An apparatus according to claim 18, wherein said carriage includes a substantially rigid vertically-oriented C-shaped frame having a vertical bight part joined to rearward ends of top and bottom leg parts which are horizontally elongated and define vertically therebetween a horizontally elongated working space which opens both forwardly and sidewardly in opposite directions, said upper and lower weld rolls being mounted on the respective upper and lower leg parts adjacent front free ends thereof, said weld rolls being positioned horizontally forwardly a substantial distance from said bight part to define therebetween a horizontally elongated sheet overlap region which opens sidewardly in opposite directions and is substantially aligned with the predetermined positions defined on said first and second table assemblies when said splicing mechanism is in a front position.

20. An apparatus according to claim 19, wherein said control means actuates said weld assembly for engaging overlapped edge portions of the sheets at said overlap region to weld the edge portions as the carriage moves rearwardly toward a rear position, and gripping means mounted on the carriage for engaging the spliced sheet and movably discharging the spliced sheet forwardly from the splicing position as the carriage moves from its rear position towards its front position.

21. An apparatus according to claim 1, including gripping means mounted on the carriage for engaging the spliced sheet and movably discharging the spliced sheet away from the splicing position in a direction which is generally parallel with the predetermined line of movement as the carriage moves along said line of movement relative to said frame means.

22. An apparatus according to claim 21, wherein the gripping means includes generally opposed top and bottom gripping members which are relatively vertically movable for gripping the spliced sheet therebetween, said top and bottom gripping members being mounted on said carriage in adjacent relationship to but spaced from said planishing assembly so that said planishing assembly is positioned between said gripping means and said welding assembly.

23. An apparatus according to claim 18, including gripping means mounted on the carriage for engaging the spliced sheet and movably discharging the spliced sheet away from the splicing position in a direction which is generally parallel with the predetermined line of movement as the carriage moves along said line of movement relative to said frame means.

24. An apparatus according to claim 19, including gripping means mounted on said carriage for engaging the spliced sheet and movably discharging the spliced sheet forwardly from the splicing position in a direction substantially parallel to the line of movement as the carriage moves from its rear position towards its front position.

25. An apparatus according to claim 24, wherein said gripping means includes opposed top and bottom gripping members which are relatively vertically movable for gripping the spliced sheet therebetween, said top and bottom gripping members being respectively mounted on said top and bottom leg parts adjacent the front rear ends thereof in forwardly spaced relationship from the respective upper and lower weld rolls.

26. An apparatus according to claim 18, including position control means associated with each said sheet supporting structure for initially positioning the sheet at the predetermined position so that a leading edge of the sheet is spaced a predetermined distance from the central vertical plane.

27. An apparatus according to claim 26, wherein said position control means includes movable stop means which are positioned for abutting the leading edge of the sheet when in said predetermined position and are movable into a position of non-engagement when the sheet is advanced to said splicing position.

* * * * *